(12) United States Patent
Suh et al.

(10) Patent No.: US 11,556,926 B2
(45) Date of Patent: Jan. 17, 2023

(54) METHOD FOR APPROVING USE OF CARD BY USING BLOCKCHAIN-BASED TOKEN ID AND SERVER USING METHOD

(71) Applicant: COINPLUG, INC., Seongnam-si (KR)

(72) Inventors: Moon Gju Suh, Seoul (KR); Jay Wu Hong, Seoul (KR); Joon Sun Uhr, Seongnam-si (KR)

(73) Assignee: COINPLUG, INC., Seongnam (KR)

(*) Notice: Subject to any disclaimer, the term of this patent is extended or adjusted under 35 U.S.C. 154(b) by 118 days.

(21) Appl. No.: 16/655,248

(22) Filed: Oct. 17, 2019

(65) Prior Publication Data
US 2020/0051074 A1 Feb. 13, 2020

Related U.S. Application Data (63) Continuation of application No. PCT/KR2018/004521, filed on Apr. 18, 2018.

(30) Foreign Application Priority Data

Apr. 18, 2017 (KR) .................. 10-2017-0049929

(51) Int. Cl.
G06Q 20/38 (2012.01)
(52) U.S. Cl.
CPC ....... *G06Q 20/385* (2013.01); *G06Q 20/3829* (2013.01)
(58) Field of Classification Search
CPC .................................................. G06Q 20/385
See application file for complete search history.

(56) References Cited

U.S. PATENT DOCUMENTS

2003/0028481 A1* 2/2003 Flitcroft ............... G06Q 20/00
705/39
2012/0303527 A1* 11/2012 Karlisch ............. G06Q 20/425
705/44
(Continued)

FOREIGN PATENT DOCUMENTS

KR          10-0617657 B1      8/2006
KR       10-2008-0027660 A     3/2008
(Continued)

OTHER PUBLICATIONS

Shizra Sultan • Abdul Ghafoor Abbasi • Awais Shibli • Ali Nasir, Secure protocol for financial transactions using smartphones—SPFT formally proved by A VISPA, 2014 11th International Conference on Security and Cryptography, p. 4. (Year: 2014).*
(Continued)

*Primary Examiner* — Mamon Obeid
*Assistant Examiner* — Zehra Raza
(74) *Attorney, Agent, or Firm* — Xsensus LLP (57) ABSTRACT

The present disclosure relates to a method for approving the use of a card by using a token-ID, wherein, in a state where a card token ID, identification information of a user, a push token ID, and a public key of the user are registered in a blockchain database and a blockchain transaction ID corresponding thereto is managed, when payment request information is acquired, a relay server: requests authentication of order data from a user terminal; checks whether a user signature value obtained in response to the authentication request is valid, and registers the order data in the blockchain database; and registers, in the blockchain database, approval result information which is obtained through verification of the order data by a financial server, and transmits the approval result information to at least one of a service providing terminal and the user terminal.

17 Claims, 4 Drawing Sheets

(56) References Cited

U.S. PATENT DOCUMENTS

| | | |
|---|---|---|
| 2014/0236838 A1 | 8/2014 | Asar et al. |
| 2015/0254639 A1* | 9/2015 | Radu ................. G06Q 20/3672 705/41 |
| 2017/0076286 A1* | 3/2017 | Castinado ............ G06Q 20/405 |
| 2018/0204191 A1* | 7/2018 | Wilson ............... G06Q 20/3829 |

FOREIGN PATENT DOCUMENTS

| | | |
|---|---|---|
| KR | 10-1393720 B1 | 5/2014 |
| KR | 10-1590076 B1 | 2/2016 |
| WO | 2017/006134 A1 | 1/2017 |

OTHER PUBLICATIONS

International Search Report and Written Opinion dated Jul. 25, 2018 for PCT/KR2018/004521 filed on Apr. 18, 2018, 9 pages including English Translation of the International Search Report.

Office Action dated Dec. 24, 2020, in corresponding Canadian patent Application No. 3,059,872, 4 pages.

Office Action dated Nov. 30, 2021 in Canadian Patent Application No. 3,059,872, 7 pages.

Extended European Search Report dated Dec. 9, 2020, issued in corresponding European Patent Application No. 18787035.7, 9 pages.

\* cited by examiner

METHOD FOR APPROVING USE OF CARD BY USING BLOCKCHAIN-BASED TOKEN ID AND SERVER USING METHOD

CROSS REFERENCE TO RELATED APPLICATIONS

This application is a bypass continuation of PCT/KR2018/004521, filed Apr. 18, 2018, which claims foreign priority to Korean application 10-2017-0049929 filed Apr. 18, 2017, the disclosures of each are incorporated herein by reference in their entireties.

FIELD OF THE DISCLOSURE

The present disclosure relates to a method for approving use of a card using a token ID; and more particularly, to the method for performing a process of obtaining a push token ID registered in a blockchain database by using a blockchain transaction ID corresponding to the user identification information included in the payment request information and a process of transmitting or supporting another device to transmit an authentication request for the order data to the user device corresponding to the obtained push token ID; if a user signature value created by signing the order data with a private key of the user is obtained from the user device in response to the authentication request for the order data, a process of confirming whether the user signature value is valid by using the public key of the user registered in the blockchain database, a process of registering the order data in the blockchain database; and a process of transmitting approval request information, including the order data and the card token ID corresponding to the user identification information, to a financial server, a process of instructing the financial server to verify the order data, and a process of registering the approval result information in the blockchain database and a process of transmitting or supporting another device to transmit the approval result information to at least one of the service-providing device and the user device, and the server using the same.

BACKGROUND OF THE DISCLOSURE

With the increasing number of credit card users at online shopping malls and brick-and-mortar stores, credit cards are becoming an important payment tool together with cash.

Conventionally, a general payment flow using a credit card is as follows.

First, a user makes a purchase request to a sales service provider such as a shopping mall to purchase a specific product or service, and inputs a card number to an online authentication company.

Then, the online authentication company requests a card service company to authenticate the card number, and receives an authentication result of the card number from the card service company. If the authentication result is successful, the online authentication company transmits an authentication number to the sales service provider, the shopping mall transmits the encrypted card number and the authentication number to a payment gateway (PG) company, the payment gateway company transmits the encrypted card number and the authentication number to a VAN company, and the VAN company transmits the encrypted card number and the authentication number to the card service company. And an approval result from the card service company is transmitted to, in the order of the VAN company, the payment gateway company, and the sales service provider, and a final approval result is received by the user.

Conventionally, such a payment procedure has been a process in which a user authentication and a card authentication are performed separately, and then, a registered payment password and the card number of the credit card of the user are inputted, in order to perform online settlement. This payment procedure of inputting a card number of a credit card has vulnerability of identity forgery due to its online characteristics. In addition, since the payment gateway company and the VAN company store and use the user's card number, there is a drawback that the user is exposed to a high risk of leakage of card information.

Accordingly, in order to maintain a conventional payment system, excessive cost and effort are required to obtain an information security certification, qualified PG companies and PCI-DSS certification qualification, and an abnormal transaction tracking system such as Fraud Detection System (FDS) is also required, however, trained professionals in the field are in shortage.

A flow of simple payment, which is a more evolved step than this general payment procedure, is as follows.

First, when the user makes a purchase request to the sales service provider, the service provider transmits a payment request to the payment gateway company. Then, the payment gateway company sends an authentication-requesting signal to a simple payment app provided to the user's mobile device by the payment gateway company, and the user may input a pre-registered password as a response to the authentication-requesting signal. Then, the card number of the credit card is transmitted from the simple payment app to the payment gateway company, the payment gateway company confirms the authentication of the card number and transmits the encrypted card number to the VAN company, and the VAN company again transmits the card number to the card service company. And an approval result from the card service company is transmitted to, in the order of the VAN company, the payment gateway company, and the sales service provider, and a final approval result is received by the user.

Such a simple payment procedure is a service that simplifies complexity and eliminates inconvenience of a conventional payment procedure in an online settlement by merely inputting an app password.

However, such a simple payment procedure is also a process of storing and utilizing the user's card number through the app of the payment gateway company that has obtained a qualification of a qualified PG company, and since the payment gateway company and the VAN company store and use the user's credit card information, there is still a risk of leakage of the card information.

As with the disadvantages of the above-mentioned general payment procedure, the simple payment procedure also requires excessive cost and effort to obtain the information security certification, the qualified PG companies and the PCI-DSS certification qualification, and also the abnormal transaction tracking system such as the Fraud Detection system (FDS), however, the trained professionals are also in shortage.

Furthermore, in a situation where there is no dominator of the simple payment procedure in a market, the user must register the card number of the credit card he/she often uses in various simple payment apps. Especially, there are various simple payment apps all of which have disadvantage that if service providers do not have a popular simple payment app, the credit card information must be registered several times for each of the service providers.

SUMMARY OF THE DISCLOSURE

It is an object of the present disclosure to solve all the aforementioned problems.

It is another object of the present disclosure to minimize risk of exposure of card information during an approval process of use of a card.

It is still another object of the present disclosure to protect personal information by preventing the card information from being exchanged among entities participating in the approval process of the use of the card and at the same time to allow approval of the use with highly reliable identity authentication.

It is still yet another object of the present disclosure to prevent forgery and falsification of approval information by registering and managing a transaction about the approval of the use of the card in a blockchain database.

It is still yet another object of the present disclosure to minimize a system and its maintenance cost by using the blockchain database without using any VAN (Value Added Network) company or a PG (Payment Gateway) company during the approval process of the use of the card.

In order to accomplish objects above, representative structures of the present disclosure are described as follows.

In accordance with one aspect of the present disclosure, there is provided a method for approving use of a card using a token ID, including steps of: (a) on condition that a registration process of registering, in a blockchain database, a card token ID corresponding to card information on a user, user identification information to be used for identifying the user, a push token ID corresponding to an app installed on a user device of the user, and a public key of the user has been performed and on condition that a blockchain transaction ID corresponding to the registration process is being managed, if payment request information, which includes the user identification information and order data corresponding to the use of the card of the user, is acquired from a service-providing device, an intermediary server performing a process of obtaining the push token ID registered in the blockchain database by using the blockchain transaction ID corresponding to the user identification information included in the payment request information and a process of transmitting or supporting another device to transmit an authentication request for the order data to the user device corresponding to the obtained push token ID; (b) if a user signature value created by signing the order data with a private key of the user is obtained from the user device in response to the authentication request for the order data, the intermediary server performing a process of confirming whether the user signature value is valid by using the public key of the user registered in the blockchain database, and if the user signature value is determined as valid, a process of registering or supporting another device to register the order data in the blockchain database; and (c) the intermediary server performing (i) a process of transmitting or supporting another device to transmit approval request information, including the order data and the card token ID corresponding to the user identification information, to at least one financial server, a process of instructing the financial server to verify the order data included in the approval request information by referring to the order data registered in the blockchain database, wherein the order data corresponds to the card token ID included in the approval request information, and a process of instructing the financial server to transmit approval result information corresponding to a verification result to the intermediary server and (ii) if the approval result information is obtained from the financial server, a process of registering or supporting another device to register the approval result information in the blockchain database and a process of transmitting or supporting another device to transmit the approval result information to at least one of the service-providing device and the user device.

As one example, the financial server includes a 1-st financial server and a 2-nd financial server, and wherein, at the step of (c), the intermediary server performs (i) a process of transmitting the approval request information, a process of instructing the 1-st financial server to verify the order data included in the approval request information by referring to the order data registered in the blockchain database, wherein the order data corresponds to the card token ID included in the approval request information, and if the order data is determined as valid, a process of instructing the 1-st financial server to transmit an approval request for the order data to the 2-nd financial server and (ii) if the approval result information is transmitted from the 2-nd financial server to the 1-st financial server, a process of receiving the approval result information from the 1-st financial server or another device.

As one example, before the step of (a), the method further comprises steps of: (a01) if card registration request information which includes personal information on the user, the user identification information, the card information, and the push token ID is obtained from the user device, the intermediary server performing a process of transmitting a verification request for the card information to the financial server; (a02) if a verification result including a card index key corresponding to the card information is obtained from the financial server, the intermediary server performing a process of generating a card token ID corresponding to the card index key and a process of transmitting or supporting another device to transmit a user authentication request for a user authentication to the user device corresponding to the push token ID; and (a03) if the public key of the user corresponding to the user authentication is obtained from the user device, the intermediary server performing (i) the registration process of registering or supporting another device to register, in the blockchain database, the card token ID, the user identification information, the push token ID, and the public key and a process of obtaining the blockchain transaction ID corresponding to the registration process and (ii) a process of transmitting or supporting another device to transmit the card token ID and the card index key to the financial server, to thereby allow the financial server to generate mapping relation between the card information and the card token ID.

As one example, at the step of (a03), the intermediary server performs (i) a process of transmitting the user authentication request, to thereby allow the user device to generate the private key and the public key in response to the user authentication request, allow the user device to transmit a setting request, for the user to set confirmation information, to the user, and allow the user device to store the confirmation information obtained from the user and (ii) a process of receiving the public key from the user device or another device.

As one example, the financial server includes a 1-st financial server and a 2-nd financial server, and wherein, at the step of (a02), the intermediary server performs (i) a process of transmitting a verification request for the card information, to thereby allow the 1-st financial server to transmit the verification request for the card information to the 2-nd financial server and (ii) if the verification result including a card index key corresponding to the card information is transmitted from the 2-nd financial server to the 1-st financial server, a process of receiving the verification result from the 1-st financial server or another device, and wherein, at the step of (a03), the intermediary server performs a process of transmitting the card token ID and the card index key, to thereby allow the 1-st financial server to generate mapping relation between the card information and the card token ID.

As one example, the method further comprises a step of: (d) if acquisition request information including acquisition data is obtained from the service-providing device wherein the acquisition data includes at least one piece of the order data which is requested for acquisition by the service-providing device among the order data registered in the blockchain database after being approved at the step of (c), the intermediary server performing (i) a process of determining whether the acquisition data is valid, to thereby transmit or support another device to transmit a validation result of determining whether the acquisition data is valid to the service-providing device, and if confirmation information on the validation result is obtained from the service-providing device, a process of registering or supporting another device to register the acquisition data in the blockchain database, (ii) a process of transmitting the acquisition request information including the acquisition data to the financial server, to thereby allow the financial server to determine whether the acquisition data is valid and allow the financial server to transmit acquisition result information to the intermediary server, and (iii) if the acquisition result information is obtained from the financial server, a process of registering or supporting another device to register the acquisition result information in the blockchain database and a process of transmitting or supporting another device to transmit the acquisition result information to the service-providing device.

As one example, the intermediary server performs a process of transmitting the acquisition request information, to thereby allow the financial server to determine whether the acquisition data included in the acquisition request information is registered in the blockchain database, and if the acquisition data is determined as registered in the blockchain database, allow the financial server to determine the acquisition data as valid.

As one example, the financial server includes a 1-st financial server and a 2-nd financial server, and wherein the intermediary server performs (i) a process of transmitting the acquisition request information, to thereby allow the 1-st financial server to determine whether the acquisition data included in the acquisition request information is registered in the blockchain database, allow the 1-st financial server to determine whether the acquisition data is valid, and if the acquisition data is determined as valid, allow the 1-st financial server to transmit an acquisition request for the acquisition data to the 2-nd financial server, and (ii) if the acquisition result information is transmitted from the 2-nd financial server to the 1-st financial server, a process of receiving the acquisition result information from the 1-st financial server or another device.

As one example, the user identification information includes at least one of a user ID, an SSN, an ID of the user device, an IP address of the user device, a MAC address of the user device, and a phone number, as information unique to each user for identifying the user.

As one example, at the step of (b), the intermediary server performs a process of extracting the order data from the user signature value by using the public key of the user registered in the blockchain database and a process of confirming whether the order data extracted from the user signature value corresponds to the order data included in the payment request information, to thereby determine whether the user signature value is valid.

As one example, at the step of (b), the intermediary server performs a process of transmitting a confirmation request for the confirmation information to the user in response to the authentication request for the order data, to thereby allow the user device to determine whether the confirmation information obtained from the user corresponds to preset confirmation information, and if the confirmation information obtained from the user corresponds to the preset confirmation information, allow the user device to transmit the user signature value created by signing the order data with the private key of the user.

As one example, the confirmation information includes at least one of (i) a password, (ii) a PIN code, (iii) fingerprint information of the user, and (iv) biometric information of the user.

In accordance with another aspect of the present disclosure, there is provided an intermediary server for approving use of a card using a token ID, including: a communication part for, on condition that a registration process of registering, in a blockchain database, a card token ID corresponding to card information on a user, user identification information to be used for identifying the user, a push token ID corresponding to an app installed on a user device of the user, and a public key of the user has been performed and on condition that a blockchain transaction ID corresponding to the registration process is being managed, acquiring payment request information, which includes the user identification information and order data corresponding to the use of the card of the user, from a service-providing device; and a processor configured to execute instructions to perform or support another device to perform: (I) a process of obtaining the push token ID registered in the blockchain database by using the blockchain transaction ID corresponding to the user identification information included in the payment request information and a process of transmitting or supporting another device to transmit an authentication request for the order data to the user device corresponding to the obtained push token ID; (II) if a user signature value created by signing the order data with a private key of the user is obtained from the user device in response to the authentication request for the order data, a process of confirming whether the user signature value is valid by using the public key of the user registered in the blockchain database, and if the user signature value is determined as valid, a process of registering or supporting another device to register the order data in the blockchain database; and (III) (i) a process of transmitting or supporting another device to transmit approval request information, including the order data and the card token ID corresponding to the user identification information, to at least one financial server, a process of instructing the financial server to verify the order data included in the approval request information by referring to the order data registered in the blockchain database, wherein the order data corresponds to the card token ID included in the approval request information, and a process of instructing the financial server to transmit approval result information corresponding to a verification result to the intermediary server and (ii) if the approval result information is obtained from the financial server, a process of registering or supporting another device to register the approval result information in the blockchain database and a process of transmitting or supporting another device to transmit the approval result information to at least one of the service-providing device and the user device.

As one example, the financial server includes a 1-st financial server and a 2-nd financial server, and wherein, at the process of (III), the processor performs (i) a process of transmitting the approval request information, a process of instructing the 1-st financial server to verify the order data included in the approval request information by referring to the order data registered in the blockchain database, wherein the order data corresponds to the card token ID included in the approval request information, and if the order data is determined as valid, a process of instructing the 1-st financial server to transmit an approval request for the order data to the 2-nd financial server and (ii) if the approval result information is transmitted from the 2-nd financial server to the 1-st financial server, a process of receiving the approval result information from the 1-st financial server or another device.

As one example, before the process of (I), the processor further performs: a process of, if card registration request information which includes personal information on the user, the user identification information, the card information, and the push token ID is obtained from the user device, transmitting a verification request for the card information to the financial server; a process of, if a verification result including a card index key corresponding to the card information is obtained from the financial server, generating a card token ID corresponding to the card index key and a process of transmitting or supporting another device to transmit a user authentication request for a user authentication to the user device corresponding to the push token ID; and a process of, if the public key of the user corresponding to the user authentication is obtained from the user device, performing (i) the registration process of registering or supporting another device to register, in the blockchain database, the card token ID, the user identification information, the push token ID, and the public key and a process of obtaining the blockchain transaction ID corresponding to the registration process and (ii) a process of transmitting or supporting another device to transmit the card token ID and the card index key to the financial server, to thereby allow the financial server to generate mapping relation between the card information and the card token ID.

As one example, the processor performs (i) a process of transmitting the user authentication request, to thereby allow the user device to generate the private key and the public key in response to the user authentication request, allow the user device to transmit a setting request, for the user to set confirmation information, to the user, and allow the user device to store the confirmation information obtained from the user and (ii) a process of receiving the public key from the user device or another device.

As one example, the financial server includes a 1-st financial server and a 2-nd financial server, and wherein the processor performs (i) a process of transmitting a verification request for the card information, to thereby allow the 1-st financial server to transmit the verification request for the card information to the 2-nd financial server and (ii) if the verification result including a card index key corresponding to the card information is transmitted from the 2-nd financial server to the 1-st financial server, a process of receiving the verification result from the 1-st financial server or another device, and wherein the processor performs a process of transmitting the card token ID and the card index key, to thereby allow the 1-st financial server to generate mapping relation between the card information and the card token ID.

As one example, the processor further performs: (IV) if acquisition request information including acquisition data is obtained from the service-providing device wherein the acquisition data includes at least one piece of the order data which is requested for acquisition by the service-providing device among the order data registered in the blockchain database after being approved at the process of (III), (i) a process of determining whether the acquisition data is valid, to thereby transmit or support another device to transmit a validation result of determining whether the acquisition data is valid to the service-providing device, and if confirmation information on the validation result is obtained from the service-providing device, a process of registering or supporting another device to register the acquisition data in the blockchain database, (ii) a process of transmitting the acquisition request information including the acquisition data to the financial server, to thereby allow the financial server to determine whether the acquisition data is valid and allow the financial server to transmit acquisition result information to the intermediary server, and (iii) if the acquisition result information is obtained from the financial server, a process of registering or supporting another device to register the acquisition result information in the blockchain database and a process of transmitting or supporting another device to transmit the acquisition result information to the service-providing device.

As one example, the processor performs a process of transmitting the acquisition request information, to thereby allow the financial server to determine whether the acquisition data included in the acquisition request information is registered in the blockchain database, and if the acquisition data is determined as registered in the blockchain database, allow the financial server to determine the acquisition data as valid.

As one example, the financial server includes a 1-st financial server and a 2-nd financial server, and wherein the processor performs (i) a process of transmitting the acquisition request information, to thereby allow the 1-st financial server to determine whether the acquisition data included in the acquisition request information is registered in the blockchain database, allow the 1-st financial server to determine whether the acquisition data is valid, and if the acquisition data is determined as valid, allow the 1-st financial server to transmit an acquisition request for the acquisition data to the 2-nd financial server, and (ii) if the acquisition result information is transmitted from the 2-nd financial server to the 1-st financial server, a process of receiving the acquisition result information from the 1-st financial server or another device.

In addition, recordable media that are readable by a computer for storing a computer program to execute the method of the present disclosure is further provided.

DETAILED DESCRIPTION OF THE PREFERRED EMBODIMENTS

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views. The headings and abstract of the present disclosure provided herein are for convenience only and do not limit or interpret the scope or meaning of the embodiments.

To allow those skilled in the art to the present disclosure to be carried out easily, the example embodiments of the present disclosure by referring to attached diagrams will be explained in detail as shown below.

Figure 1:
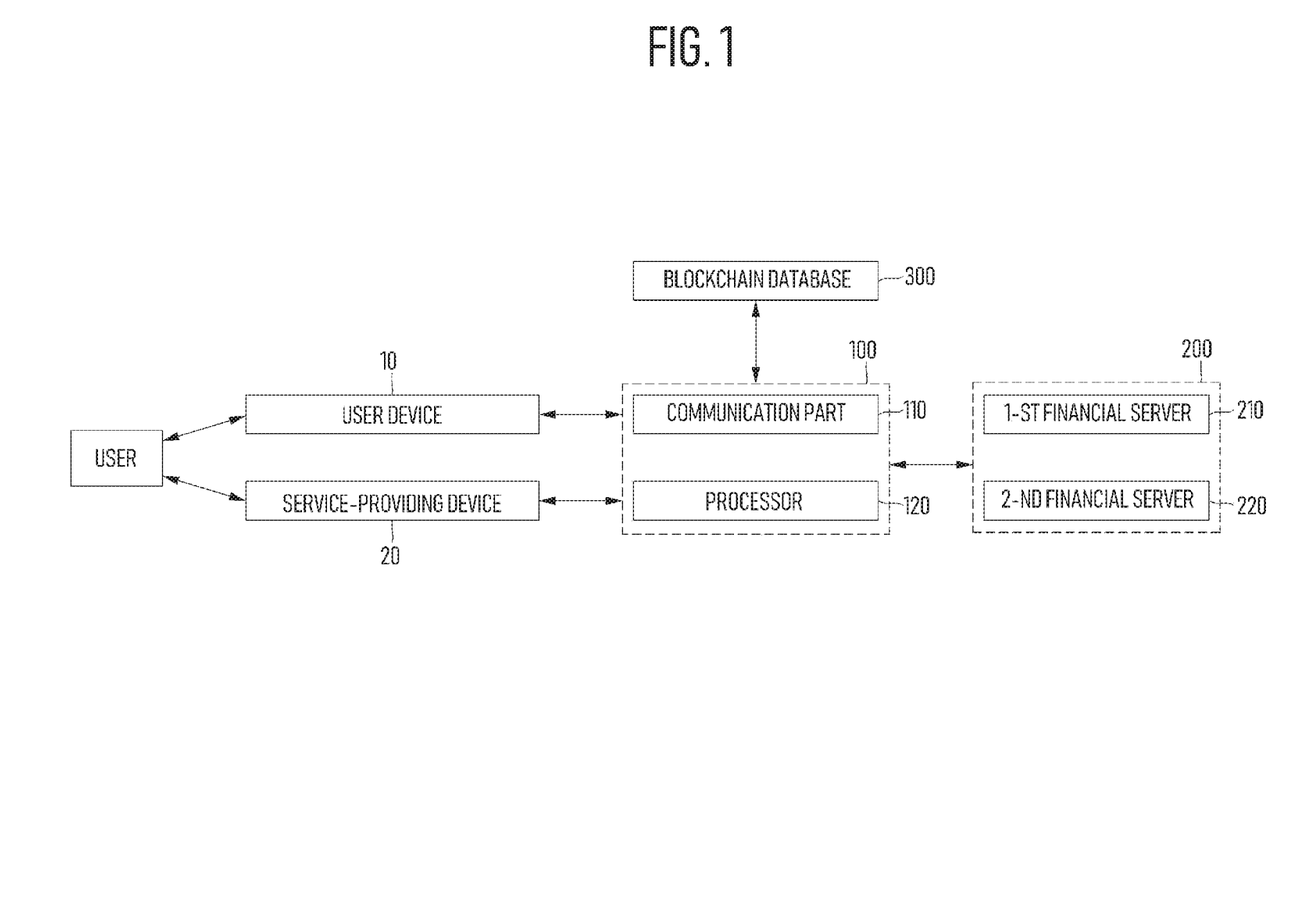
FIG. 1 is a drawing schematically illustrating a system for approving use of a card by using a token ID in accordance with one example embodiment of the present disclosure.

FIG. 1 is a drawing schematically illustrating a system for approving use of a card by using a token ID in accordance with one example embodiment of the present disclosure. The system may include a user device 10, a service-providing device 20, an intermediary server 100, and at least one financial server 200.

First, the user device 10 may receive information corresponding to the use of the card, and may be a mobile device for supporting a user to confirm the received information, like a mobile computer, a PDA/EDA, a mobile phone, a smart-phone, a tablet, etc. And, the user device 10 is not limited thereto, and may include any mobile device like a digital camera, a personal navigation device, and a mobile gaming device, etc. capable of wired and wireless communication. In addition, the user device 10 may include a communication part and a processor.

Also, the user device 10 may include an application, i.e., an app, which provides a user interface managed by the intermediary server.

And, the service-providing device 20 may be a device performing payment in response to the use of the card by the user, and may include a payment terminal of an off-line shopping mall or a payment server of an on-line shopping mall. Also, the service-providing device 20 may include any terminal capable of allowing the payment for cost corresponding to purchase of a service or a product on-line or off-line by using the card.

Next, the intermediary server 100 may include a communication part 110 and a processor 120. And, the intermediary server 100 may include multiple servers capable of performing each of functions related to approval of the use of the card. Further, the intermediary server 100 may be servers corresponding to each node of a blockchain database 300 or the servers managing each node of the blockchain database 300. In addition, the intermediary server 100 may be a transaction server which manages transactions with other devices regarding the approval of the use of the card.

Specifically, the intermediary server 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part 110 of such devices may transmit requests to and receive responses from other linked devices. As one example, such requests and responses may be carried out by the same TCP session, but the scope of the present disclosure is not limited thereto. For example, they could be transmitted and received as UDP datagrams.

The processor 120 of such devices may include hardware configuration of MPU (Micro Processing Unit) or CPU (Central Processing Unit), cache memory, data bus, etc. Additionally, any OS and software configuration of applications that achieve specific purposes may be further included.

Next, a financial server 200 may include a communication part and a processor, and may provide a service for the approval of the use of the card by the user and for acquisition by a service provider. Next, the financial server 200 may be a card company server, but the scope of the present disclosure is not limited thereto, and may include any server performing an approval service of the use of the card, and may be comprised of each of multiple servers corresponding to each of entities providing each card service of its own. For reference, throughout the present disclosure, the acquisition may mean a process where an acquiring bank or an acquirer allows merchants to accept credit card payments or debit card payments from card-issuing banks within an association. Also, the financial server 200 may include a 1-st financial server and a 2-nd financial server, and the 1-st financial server 210 may perform confirmation of various information required for the approval of the use of the card over communication with the intermediary server 100 and the blockchain database 300, and the 2-nd financial server 220 may perform the approval of the use of the card confirmed by the 1-st financial server 210 over communication with the 1-st financial server 210. Herein, the 2-nd financial server 220 may communicate with the 1-st financial server 210 by using an open API, i.e., application programming interface.

Specifically, the financial server 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

A method for approving the use of the card by using the token ID in accordance with one example embodiment of the present disclosure is described as follows.

Figure 2:
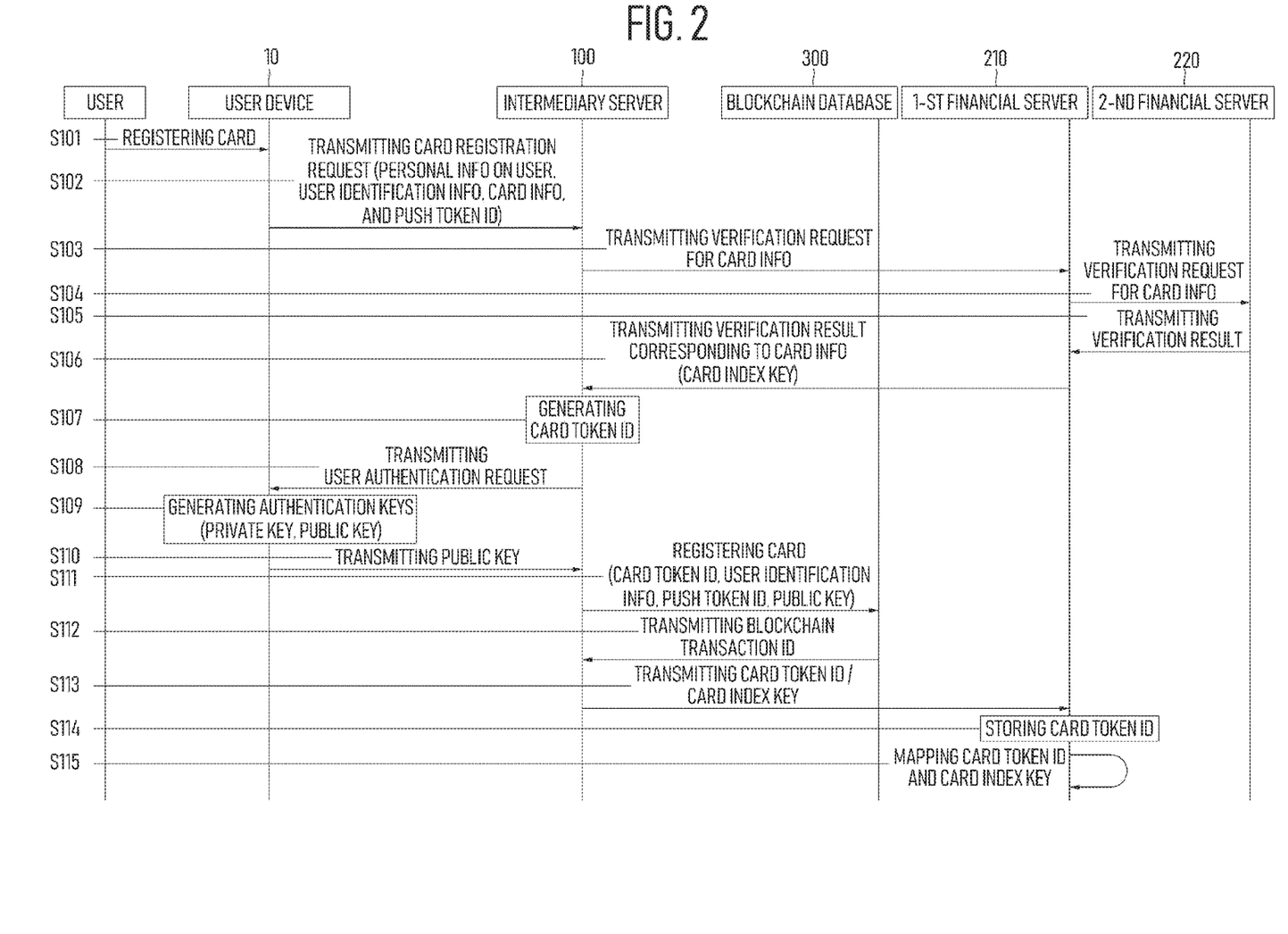
FIG. 2 is a drawing schematically illustrating a process of registering the card in accordance with one example embodiment of the present disclosure.

First, the method for registering the card in accordance with one example embodiment of the present disclosure is described by referring to FIG. 2.

To register the card desired by the user, the user inputs personal information, user identification information, and card information, to be used for registration of the card, at a step of S101, while the user is connected to the intermediary server 100 using the user device 10, for example, while the user is executing the app installed on the user device 10 for the registration of the card. Herein, the personal information may include a name of the user, a birth date of the user, etc., and the user identification information may include at least one of a user ID, an SSN, an ID of the user device, an IP address of the user device, a MAC address of the user device, and a phone number, as information unique to each user for identifying the user. And, the card information may include the number of the card, a key number of the card, but the scope of the present disclosure is not limited thereto, and may include information on an entity who issues the card, that is, information on a card issuing company, an expiration date of the card, information on the user of the card, etc.

And, if the user inputs the personal information, the user identification information, and the card information and if the user requests for the registration of the card, then the user device 10 may transmit or support another device to transmit card registration request information, which includes the personal information on the user, the user identification information, the card information, and the push token ID, to the intermediary server 100 at a step of S102. Herein, the push token ID may be the token ID corresponding to the app installed on the user device 10. And, as another example, the user device 10 may extract and transmit the personal information and the user identification information from a storage part of the user device 10, instead of the user inputting the personal information and the user identification information.

Then, the intermediary server 100 may acquire the card registration request information, which includes the personal information on the user, the user identification information, the card information, and the push token ID, from the user device 10, and may perform a process of transmitting or supporting another device to transmit a verification request for the card information to the financial server 200, at a step of S103.

In response to the verification request for the card information from the intermediary server 100, the financial server 200 may confirm the card information for which the verification is requested, and if the card information for which the verification is requested is determined as identical to the card information on the registered card, i.e., if the card information for which the verification is requested is determined as valid, then the financial server 200 may generate a card index key corresponding to the card information and may perform a process of transmitting or supporting another device to transmit a verification result including the card index key to the intermediary server 100, at a step of S106.

Herein, if the financial server 200 includes the 1-st financial server 210 and the 2-nd financial server 220, then in response to the verification request for the card information received from the intermediary server 100, the 1-st financial server 210 may transmit or support another device to transmit the verification request for the card information to the 2-nd financial server 220, at a step of S104. And the 2-nd financial server 220 may confirm the card information for which the verification is requested in response to the verification request for the card information, and if the card information for which the verification is requested is determined as identical to the card information on the registered card, i.e., if the card information for which the verification is requested is determined as valid, then the 2-nd financial server 220 may generate the card index key corresponding to the card information, may perform a process of transmitting or supporting another device to transmit the verification result including the card index key to the 1-st financial server 210, at a step of S105. And the 1-st financial server 210 may transmit or support another device to transmit the verification result, including the card index key, of the card information received from the 2-nd financial server 220 to the intermediary server 100 at a step of S106.

Then, the intermediary server 100 may generate the card token ID corresponding to the card index key by referring to the verification result of the card information received from the financial server 200 at a step of S107.

And, the intermediary server 100 may confirm the user by referring to the card registration request information received from the user device 10. Herein, the user may be confirmed by using a Public Key Infrastructure (PKI) based certificate, or using the personal information on the user, but the scope of the present disclosure is not limited thereto. As one example, the user may be confirmed by a public key certificate based on the PKI, i.e., the Public Key Infrastructure, an OPSign certificate, or the personal information that can confirm an identity of a person, a bank, a group, or an organization, like an SSN, a passport, the Employer Identification Number, Corporation Registration Number, Business Registration Number, login information, etc.

And, if the user is confirmed, the intermediary server 100 may transmit or support another device to transmit a user authentication request for a user authentication to the app corresponding to the push token ID included in the card registration request information, that is, to the user device 10 on which the app is installed, at a step of S108.

Then, the user device 10 may generate the private key and the public key, which are authentication keys, in response to the user authentication request, at a step of S109, and may allow the user to set confirmation information to be used for controlling access to the private key by the user. Herein, the confirmation information may be information to access the private key, and may include at least one of a password, a PIN code, fingerprint information of the user, and biometric information of the user. As another example, the setting of the confirmation information to access the private key may be omitted as the case may be. Also, the confirmation information may be set before the authentication keys of the user are generated.

Thereafter, the user device 10 may extract the public key of the user among the authentication keys, and may transmit or support another device to transmit authentication information including the extracted public key to the intermediary server 100 at a step of S110.

The intermediary server 100 is shown above as performing user confirmation and the user authentication after generation of the card token ID, however, as another example, if the card registration request information is obtained from the user device 10, the intermediary server 100 may perform the user confirmation and the user authentication and then may transmit the verification request for the card information to the financial server 200.

Then, the intermediary server 100 may register or support another device to register the card token ID, the user identification information, the push token ID, and the public key in the blockchain database 300 capable of preventing illegal copying or forgery and falsification, at a step of S111.

As an example, the intermediary server 100 may register, in the blockchain database 300, card registration information including the card token ID, the user identification information, the push token ID, and the public key at a step of S111, and may obtain, at a step of S112, and manage a blockchain transaction ID representing location information of the card registration information, which includes the card token ID, the user identification information, the push token ID, and the public key, registered in the blockchain database 300. Herein, the blockchain database 300 may include at least part of a private blockchain database and a public blockchain database.

And, the intermediary server 100 may transmit or support another device to transmit the card token ID and the card index key to the financial server 200 at a step of S113.

Then, the financial server 200 may store the card token ID received from the intermediary server 100 at a step of S114 and may generate mapping relation between the card index key, which is at least part of the card information, and the card token ID at a step of S115. That is, the financial server 200 may confirm the card index key, which is transmitted as the verification result of the card information, by referring to the card index key received from the intermediary server 100 and may generate the mapping relation between the card index key, transmitted as the verification result, and the card token ID. Herein, if the financial server 200 includes the 1-st financial server 210 and the 2-nd financial server 220, the processes above may be performed by the 1-st financial server 210.

Also, the intermediary server 100 may transmit or support another device to transmit a result of registering the card registration information including the card token ID, the user identification information, the push token ID, and the public key, in the blockchain database 300 to the user device 10, to thereby allow the user to confirm the result of registering the card by using the user device 10.

On condition that the card has been registered according to the processes above, a method for approving the use of the card by using the token ID in accordance with one example embodiment of the present disclosure is described by referring to FIG. 3 as follows.

On condition that a registration process of registering, in the blockchain database 300, the card token ID corresponding to the card information of the user, the user identification information to be used for identifying the user, the push token ID corresponding to the app installed on the user device 10 of the user, and the public key of the user, has been performed and on condition that the blockchain transaction ID corresponding to the registration process is being managed according to the method of FIG. 2, if the user inputs or provides the user identification information corresponding to the use of the card by the user to the service-providing device 20, to proceed with placing the order corresponding to the order data at a step of S201 in order to pay the cost corresponding to the order data such as use of the service or purchase of the product on-line or off-line with the card, then the service-providing device 20 may store, at a step of S202, the order data which is information on the service or the product ordered by the user and may transmit or support another device to transmit payment request information, including the order data and the user identification information, to the intermediary server 100 at a step of S203.

Then, the intermediary server 100 may confirm, at a step of S204, the push token ID of the user registered in the blockchain database 300 by using the blockchain transaction ID corresponding to the user identification information included in the payment request information obtained from the service-providing device 20, that is, using the blockchain transaction ID obtained and managed at the registration process of the card, and may obtain the confirmed push token ID at a step of S205.

And, the intermediary server 100 may transmit or support another device to transmit an order authentication request including the order data, to be used for authenticating the order data, to the app corresponding to the push token ID, that is, to the user device 10 on which the app corresponding to the push token ID is installed, at a step of S206.

Then, the user device 10 may transmit a confirmation request for the order data and the order authentication request to the user at a step of S207. And, after the user confirms that the order data corresponds to what the user ordered, if the user inputs the confirmation information set by the user including at least part of the password, the PIN code, the fingerprint information on the user, and the biometric information on the user, then the user device 10 may determine, at a step of S208, whether the confirmation information inputted by the user is identical to preset confirmation information which has been set by the user in advance.

And, if the confirmation information inputted by the user is determined as identical to the preset confirmation information, the user device 10 may generate and transmit or support another device to transmit a user signature value corresponding to the order data to the intermediary server 100 at a step of S209. As an example, if the confirmation information inputted by the user is determined as identical to the preset confirmation information, the user device 10 may be allowed to access the stored private key of the user, and as a result, may generate the user signature value created by signing the order data with the private key of the user, and may transmit the generated user signature value to the intermediary server 100.

Then, the intermediary server 100 may obtain the user signature value, created by signing the order data, from the user device 10, may confirm, at a step of S210, the public key of the user registered in the blockchain database 300 by referring to the blockchain transaction ID managed as corresponding to the card registration, and may retrieve the public key, whose location is confirmed, from the blockchain database 300 at a step of S211.

Thereafter, the intermediary server 100 may determine, at a step of S212, whether the user signature value is valid by using the obtained public key. As an example, the intermediary server 100 may perform a process of extracting the order data from the user signature value by using the public key and a process of confirming whether the order data extracted from the user signature value is identical to the order data included in the payment request information, to thereby determine whether the user signature value is valid.

And, if the user signature value is determined as valid, the intermediary server 100 may register or support another device to register the order data obtained from the payment request information in the blockchain database 300 at a step of S213 and may obtain, at a step of S214, the blockchain transaction ID, corresponding to the order data, which represents the location information of the order data registered in the blockchain database 300.

Thereafter, the intermediary server 100 may transmit or support another device to transmit the approval request information, including the order data and the card token ID corresponding to the user identification information, to the financial server 200 at a step of S215. Herein, the approval request information may include the blockchain transaction ID corresponding to the order data representing the location information of the order data registered in the blockchain database 300.

Then, the financial server 200 may verify the order data included in the approval request information by referring to the order data which is registered in the blockchain database 300 as corresponding to the card token ID included in the approval request information and may transmit or support another device to transmit the approval result information corresponding to the verification result to the intermediary server 100.

As an example, if the financial server 200 includes the 1-st financial server 210 and the 2-nd financial server 220, the 1-st financial server 210 may verify the order data included in the approval request information by referring to the order data which is registered in the blockchain database 300 as corresponding to the card token ID included in the approval request information obtained from the intermediary server 100. That is, the 1-st financial server 210 may confirm, at a step of S216, the order data registered in the blockchain database 300 by referring to the blockchain transaction ID corresponding to the order data and may confirm whether the order data registered in the blockchain database 300 is identical to the order data included in the approval request information, to thereby determine whether the order data is valid at a step of S217. And, if the order data is determined as valid, the 1-st financial server may store the order data at a step of S218 and may transmit an approval request for the order data to the 2-nd financial server 220 at a step of S219. Herein, the 1-st financial server 210 may transmit or support another device to transmit the approval request for the order data to the 2-nd financial server 220 by using the card index key corresponding to the card token ID. Then, the 2-nd financial server 220 may confirm the card information using the card index key for which the approval is requested, may approve the payment for the order data corresponding to the confirmed card information, and may transmit or support another device to transmit approval result information to the 1-st financial server 210 at a step of S220.

And, the 1-st financial server 210 may transmit or support another device to transmit the approval result information obtained from the 2-nd financial server 220 to the intermediary server 100 at a step of S221.

Then, if the approval result information is obtained from the financial server 200, the intermediary server 100 may register or support another device to register the approval result information corresponding to the order data in the blockchain database 300 at a step of S222 and may obtain and manage the blockchain transaction ID corresponding to the approval result information at a step of S223.

And, the intermediary server 100 may transmit or support another device to transmit the approval result information to at least one of the service-providing device 20 and the user device 10 at a step of S224. Herein, the approval result information may include the blockchain transaction ID corresponding to the approval result information.

Also, if the approval result information is received from the intermediary server 100, the service-providing device 20 may store the approval result information at a step of S226.

Figure 4:
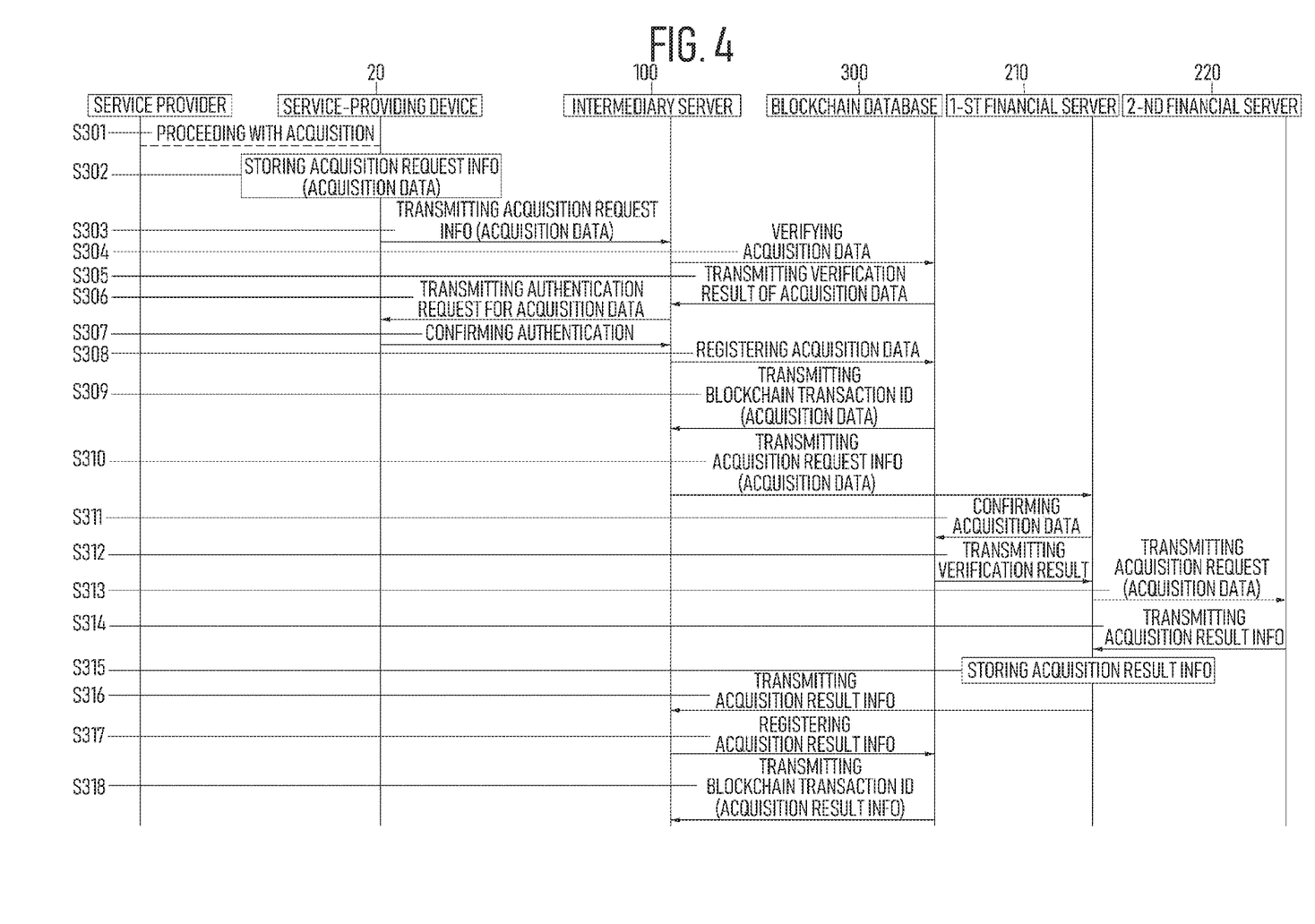
FIG. 4 is a drawing schematically illustrating a process of acquisition in the method for approving the use of the card by using the token ID in accordance with one example embodiment of the present disclosure.

A method for requesting the acquisition regarding the approved order data by the service provider, on condition that the use of the card has been approved in accordance with the processes above, is described by referring to FIG. 4 as follows.

Figure 3:
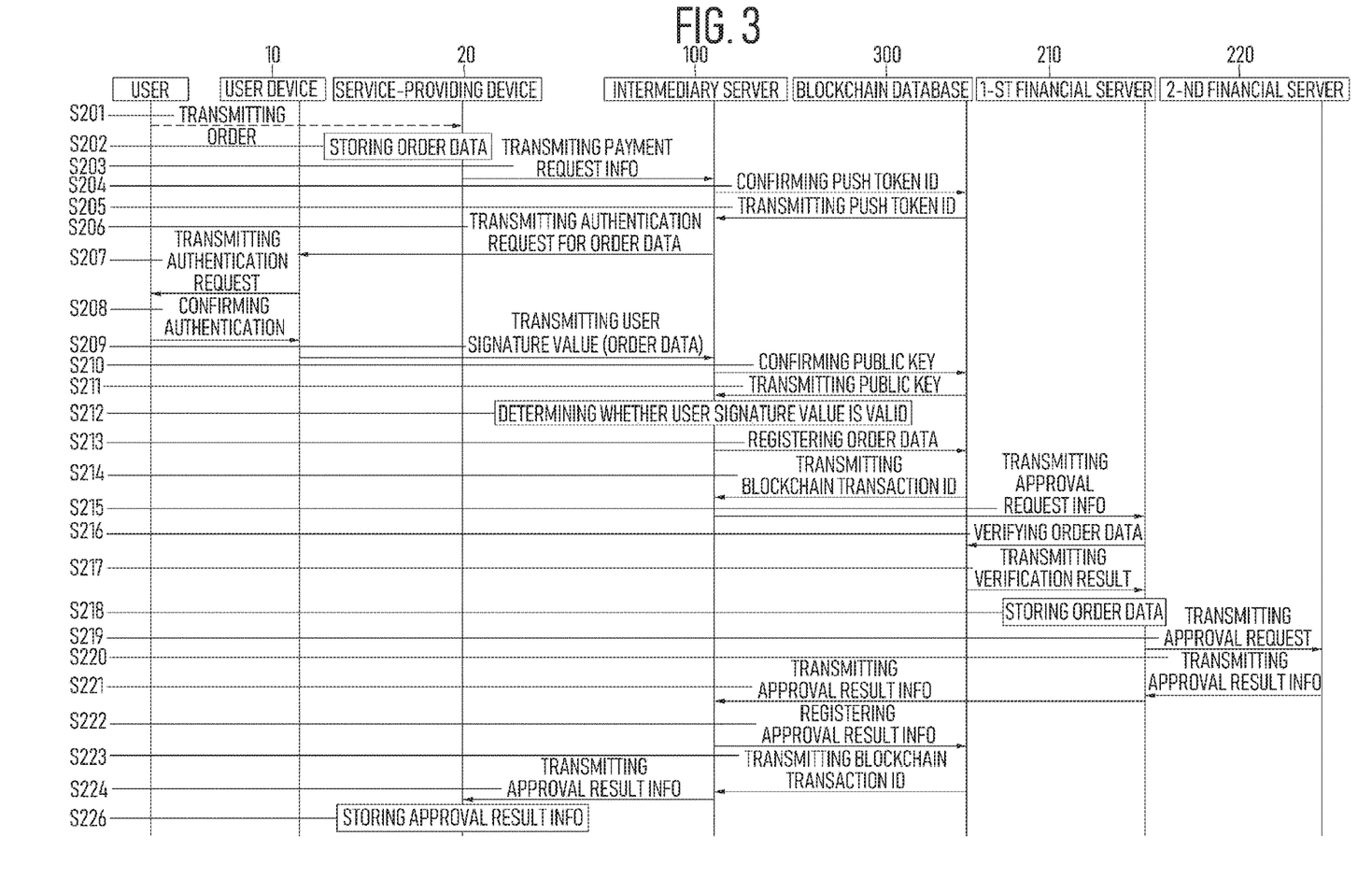
FIG. 3 is a drawing schematically illustrating a method for approving the use of the card by using the token ID in accordance with one example embodiment of the present disclosure.

On condition that the use of the card by the user has been approved and that the approval result has been registered in the blockchain database 300 in accordance with the method of FIG. 3, if the service provider proceeds, at a step of S301, with the acquisition of the order data stored after being approved, then the service-providing device 20 may store the acquisition request information at a step of S302. As an example, the service-providing device 20 may store the acquisition data including at least one piece of the order data selected by the service provider among the order data registered in the blockchain database 300 after being approved in response to the order placed by the user.

And, the service-providing device 20 may transmit or support another device to transmit the acquisition request information including the acquisition data to the intermediary server 100 at a step of S303.

Then, the intermediary server 100 may confirm whether the acquisition request information obtained from the service-providing device 20 is valid at steps of S304 and S305.

As one example, the intermediary server 100 may confirm the acquisition data included in the acquisition request information and may confirm whether the order data included in the acquisition data is valid. That is, the intermediary server 100 may confirm the order data included in the acquisition data, may confirm, at a step of S304, the order data registered in the blockchain database 300 by referring to the blockchain transaction ID corresponding to the order data, and may confirm whether the order data registered in the blockchain database 300 is identical to the order data included in the acquisition request information, to thereby determine, at a step of S305, the acquisition data as valid if the order data registered in the blockchain database 300 is identical to the order data included in the acquisition request information.

And, the intermediary server 100 may transmit or support another device to transmit an authentication request for the confirmed acquisition data to the service-providing device 20 at a step of S306.

Then, the service-providing device 20 may transmit or support another device to transmit a confirmation request for the confirmed acquisition data, which is confirmed by the intermediary server 100, to the service provider, and if a confirmation signal is received from the service provider, may transmit or support another device to transmit a confirmation result, corresponding to the authentication, to the intermediary server 100 at a step of S307.

And, if the confirmation result corresponding to the authentication is obtained from the service-providing device 20, the intermediary server 100 may register or support another device to register the confirmed acquisition data in the blockchain database 300 at a step of S308 and may obtain and manage the blockchain transaction ID, corresponding to the confirmed acquisition data, representing the location information of the confirmed acquisition data registered in the blockchain database 300 at a step of S309.

Thereafter, the intermediary server 100 may transmit or support another device to transmit the acquisition request information including the acquisition data to the financial server 200 at a step of S310. Herein, the acquisition request information may include the blockchain transaction ID corresponding to the acquisition data representing the location information of the acquisition data registered in the blockchain database 300.

Then, the financial server 200 may verify the acquisition data included in the acquisition request information by referring to the acquisition data which is registered in the blockchain database 300 as corresponding to the acquisition data included in the acquisition request information and may transmit or support another device to transmit the acquisition result information corresponding to the verification result to the intermediary server 100.

As an example, if the financial server 200 includes the 1-st financial server 210 and the 2-nd financial server 220, the 1-st financial server 210 may verify the order data included in the acquisition request information by referring to the acquisition data which is registered in the blockchain database 300 as corresponding to the acquisition request information obtained from the intermediary server 100. That is, the 1-st financial server 210 may confirm, at a step of S311, the acquisition data registered in the blockchain database 300 by referring to the blockchain transaction ID corresponding to the acquisition data and may confirm whether the acquisition data registered in the blockchain database 300 is identical to the acquisition data included in the acquisition request information, to thereby determine whether the acquisition data is valid at a step of S312. And, if the acquisition data is determined as valid, the 1-st financial server 210 may transmit an acquisition request for the acquisition data to the 2-nd financial server 220 at a step of S313. Herein, the 1-st financial server 210 may transmit or support another device to transmit the acquisition request for the acquisition data to the 2-nd financial server 220 by using the card index key corresponding to the card token ID. Then, the 2-nd financial server 220 may confirm the card information using the card index key for which the acquisition is requested, may approve the payment for the acquisition data corresponding to the confirmed card information, and may transmit or support another device to transmit the approved acquisition result information to the 1-st financial server 210 at a step of S314.

And, the 1-st financial server 210 may transmit or support another device to transmit the acquisition result information obtained from the 2-nd financial server 220 to the intermediary server 100 at a step of S316. Herein, the 1-st financial server 210 may store the acquisition result information obtained from the 2-nd financial server 220 at a step of S315.

Then, the intermediary server 100 may register or support another device to register the acquisition result information corresponding to the acquisition data obtained from the financial server 200 in the blockchain database 300 at a step of S317 and may obtain and manage the blockchain transaction ID corresponding to the acquisition result information at a step of S318.

And, the intermediary server 100 may transmit or support another device to transmit the acquisition result information to the service-providing device 20. Herein, the acquisition result information may include the blockchain transaction ID corresponding to the acquisition result.

In addition to this, if the acquisition result information is received from the intermediary server 100, the service-providing device 20 may store the acquisition result information.

The present disclosure has an effect of minimizing risk of exposure of card information during an approval process of use of a card by registering a card token ID corresponding to the card information in a blockchain database and thus approving the use of the card.

The present disclosure has another effect of protecting personal information by preventing the card information from being exchanged among entities participating in the approval process of the use of the card and at the same time allowing approval of the use with highly reliable identity authentication.

The present disclosure has still another effect of improving reliability and security of a system for approving the use of the card, as a result of preventing forgery and falsification of approval information by registering and managing a transaction about the approval of the use of the card in the blockchain database.

The present disclosure has still yet another effect of minimizing the system and its maintenance cost by using the blockchain database without using any VAN companies or PG companies during the approval process of the use of the card.

The present disclosure has still yet another effect of eliminating need of complex payment systems like simple payment, general payment, password-protected payment for service providers like an online shopping mall, since complex processes of using conventional payment gateway companies and the VAN companies are eliminated.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. method for approving use of a card using a token comprising steps of:
   (a) performing, by an intermediar server, a process of registering card registration information initially in a blockchain database, wherein the process includes:
      obtaining card registration request information, which includes personal information on a user, user identification information, card information and a push token ID corresponding to an app installed on a user device of the user, from the user device;
      transmitting a verification request for the card information from the intermediary server to a financial server;
      obtaining a verification result including a card index key corresponding to the card information from the financial server;

generating a card token ID corresponding to the card index key;

transmitting a user authentication request for a user authentication to he user device corresponding to the push token ID;

obtaining a public key of the user corresponding to the user authentication from the user device;

registering the card registration information, which includes the card token ID, the user identification information, the push token ID and the public key of the user, in the blockchain database;

obtaining a blockchain transaction ID representing a location of the card registration information registered in the blockchain database; and transmitting the card token ID and the card index key to the financial server, to thereby instruct the financial server to generate a mapping relation between the card information and the card token ID;

acquiring payment request information, which includes the user identification information and order data corresponding to the use of the card of the user, from a service-providing device, and in response to acquiring the payment request information obtaining, at the intermediary server, the card registration information from the blockchain database by using the blockchain transaction ID corresponding to the user identification information included in the payment request information, wherein the intermediary server includes one or more servers each corresponding to a node of the blockchain database, obtaining, at the intermediary server, the push token ID included in the obtained card registration information, and transmitting, by the intermediary server, an authentication request for the order data to the user device corresponding to the obtained push token ID;

(b) obtaining a user signature value from the user device, the user signature being order data signed with a private key of the user, in response to transmitting the authentication request for the order data, confirming, at the intermediary server, whether the user signature value is valid by using the public key of the user included in the obtained card registration information, and in response to confirming that the user signature value is valid, registering, at the intermediary server, the order data in the blockchain database; and (c) at the intermediary server, transmitting, approval request information, including the order data included in the payment request information and the card token ID included in the obtained card registration information, to at least one financial server, and verifying, at the financial server, the order data included in the approval request information by referring to the order data registered in the blockchain database, wherein the order data corresponds to the card token ID included in the approval request information;

transmitting, by the financial server, approval result information corresponding to a verification result to the intermediary server and obtaining the approval result information from the financial server; and in response to obtaining the approval result information from the financial server, registering, at the intermediary server, the approval result information in the blockchain database and transmitting, by the intermediary server, the approval result information to at least one of the service-providing, device and the user device.

2. The method of claim 1, wherein the financial server includes a 1-st financial server and a 2-nd financial server, further comprising:

verifying, at the 1-st financial server, the order data included in the approval request information by referring to the order data registered in the blockchain database, wherein the order data corresponds to the card token ID included in the approval request information, and transmitting, at the 1-st financial server, an approval request for the order data to the 2-nd financial server; and in response to the approval result information being transmitted from the 2-nd financial server to the 1-st financial server, receiving the approval result information from the 1-st financial server.

3. The method of claim 1, further comprising:

transmitting, at the intermediary server, the user authentication request, wherein the user device generates the private key and the public key in response to the user authentication request, the user device transmits a setting request, for the user to set confirmation information, to the user, and the user device stores the confirmation information obtained from the user; and receiving the public key from the user device.

4. The method of claim 1, wherein the financial server includes a 1-st financial server and a 2-nd financial server, further comprising:

transmitting, by the intermediary server, a verification request for the card information, wherein the 1-st financial server transmits the verification request for the card information to the 2-nd financial server and determining whether the verification result includes a card index key corresponding to the card information being transmitted from the 2-nd financial server to the 1-st financial server, in response to the verification result including the card index key corresponding to the card information being transmitted from the 2-nd financial server to the 1-st financial server, receiving the verification result from the 1-st financial server, and transmitting, by the intermediary server, the card token ID and the card index key, wherein the 1-st financial server to generate mapping relation between the card information and the card token ID.

5. The method of claim 1 further comprising:

obtaining acquisition request information including acquisition data from the service-providing device wherein the acquisition data includes at least one piece of the order data which is requested for acquisition by the service-providing device among the order data registered in the blockchain database after being approved, and in response to obtaining the acquisition request information including acquisition data determining, at the intermediary server, whether the acquisition data is valid, transmitting a validation result of determining whether the acquisition data is valid to the service-providing device, and registering the acquisition data in the blockchain database;

transmitting the acquisition request information including the acquisition data to the financial server, and determining, at the financial server whether the acquisition data is valid and transmitting, by the financial server, acquisition result information to the intermediary server; and registering the acquisition result information in the blockchain database and transmitting the acquisition result information to the service-providing device.

6. The method of claim 5, further comprising:
transmitting, by the intermediary server, the acquisition request information to the financial server, and determining, at the financial server whether the acquisition data included in the acquisition request information is registered in the blockchain database, and determining, at the financial server, the acquisition data as valid.

7. The method of claim 5, wherein the financial server includes a 1-st financial server and a 2-nd financial server, further comprising:
transmitting, by the intermediary server, the acquisition request information to the financial server, wherein the 1-st financial server determines whether the acquisition data included in the acquisition request information is registered in the blockchain database, the 1-st financial server determines whether the acquisition data is valid, and in response to the acquisition data being determined as valid, transmitting, by the 1-st financial server, an acquisition request for the acquisition data to the 2-nd financial server; and
receiving, at, the 2-nd financial server, the acquisition result information from the 1-st financial server.

8. The method of claim 1, wherein the user identification information includes at least one of a user ID, an SSN, an ID of the user device, an IP address of the user device, a MAC address of the user device, and a phone number, as information unique to each user for identifying the user.

9. The method of claim 1, further comprising:
extracting, by the intermediary server, the order data from the user signature value by using the public key of the user registered in the blockchain database; and
determining whether the user signature value is valid by confirming whether the order data extracted from the user signature value corresponds to the order data included in the payment request information.

10. The method of claim 1, further comprising:
transmitting, by the intermediary server, a confirmation request for the confirmation information to the user in response to the authentication request for the order data, wherein the user device determines whether the confirmation information obtained from the user corresponds to preset confirmation information, and in response to the confirmation information obtained from the user corresponding to the preset confirmation information, transmitting, by the user device, the user signature value created by signing the order data with the private key of the user.

11. The method of claim 10, wherein, the confirmation information includes at least one of (i) a password, (ii) a PIN code, (iii) fingerprint information of the user, and (iv) biometric information of the user.

12. An intermediary server for approving use of a card using a token ID, comprising:
circuitry configured to
register card registration information initially in a blockchain database, wherein the circuitry for registering card information is further configured to
obtain card registration request information, which includes personal information on a user, user identification information, card information and a push token ID corresponding to an app installed on a user device of the user, from the user device;
transmit a verification request for the card information from the intermediary server to a financial server;
obtain a verification result including a card index key corresponding to the card information from the financial server;
generate a card token ID corresponding to the card index key;
transmit a user authentication request for a user authentication to the user device corresponding to the push token ID;
obtain a public key of the user corresponding to the user authentication from the user device;
register the card registration information. which includes the card token ID, the user identification information, the push token ID and the public key of the user, in the blockchain database;
obtain a blockchain transaction ID representing a location of the card registration information registered in the blockchain database; and
transmit the card token ID and the card index key to the financial server, to thereby instruct the financial server to generate a mapping relation between the card information and the card token ID;
manage a blockchain transaction ID representing the card registration information registered in the blockchain database,
acquire paymentrequest information, which includes the user identification information and order data corresponding to the use of the card of the user, from a service-providing device, and in response to acquiring the payment request information
obtain the card registration information from the block chain database based on the blockchain transaction ID corresponding to the identification information included in the payment request information,
obtain the push token ID included in the obtained card registration information, and
transmit an authentication request for the order data to the user device corresponding to the obtained push token ID,
obtain a user signature value from the user device, the user signature being order data signed with a private key of the user, and confirm whether the user signature value is valid based on the public key of the user included in the obtained card registration information, and in response to the user signature value being determined as valid, register the order data in the blockchain database,
transmit approval request information, including the order data included in the payment request information and the card token ID included in the obtained card registration information, to at least one financial server, wherein the financial server is configured to verify the order data is included in the approval request information based on the order data registered in the blockchain database, wherein the order data corresponds to the card token ID included in the approval request information, and wherein the financial server is configured to transmit approval result information corresponding to a verification result to the intermediary server,
in response to obtaining the approval result information from the financial server, register the approval result information in the blockchain database and transmit the approval result information to at least one of the service-providing device and the user device, wherein the intermediary server includes one or more servers each corresponding to a node of the blockchain database.

13. The intermediary server of claim 12, wherein the financial server includes a 1-st financial server and a 2-nd financial server, wherein the circuitry is further configured to verify, at the 1-st financial server, order data. included in the approval request information by referring to the order data registered in the blockchain database, wherein the order data corresponds to the card token ID included in the approval request information, and transmit, at the 1-st financial server, an approval request for the order data to the 2-nd financial server, and in response to the approval result information being transmitted from the 2-nd financial server to the 1-st financial server, receive the approval result information from the 1-st financial server.

14. The intermediary server of claim 12, wherein the circuitry is further configured to transmit the user authentication request to the user device, wherein the user device is configured to generate the private key and the public key in response to the user authentication request, transmit a setting request, for the user o set confirmation information, to the user, and store the confirmation information obtained from the user, and receive the public key from the user device.

15. The intermediary server of claim 12, wherein the financial server includes a 1-st financial server and a 2-nd financial server, wherein the circuitry is further configured to transmit a verification request for the card information to the 1-st financial server, wherein the 1-st financial server is configured to transmit the verification request for the card information to the 2-nd financial server, and determine whether the verification result includes a card index key corresponding to the card information being transmitted from the 2-nd financial server to the 1-st financial server, in response to the verification result including the card index key corresponding to the card information being transmitted from the 2-nd financial server to the 1-st financial server, receive the verification result from the 1-st financial server, and transmit the card token ID and the card index key to the 1-st financial server, wherein the 1-st financial server is configured to generate mapping relation between the card information and the card token ID.

16. The intermediary server of claim 12, wherein the circuitry is further configured to obtain acquisition request information including acquisition data from the service-providing device wherein the acquisition data includes at least one piece of the order data which is requested for acquisition by the service-providing, device among the order data registered in the blockchain database after being approved, and in response to obtaining the acquisition request information including acquisition data determine whether the acquisition data is valid, and transmit a validation result to the service-providing device, and register the acquisition data in the blockchain database, transmit the acquisition request information including the acquisition data to the financial server, and determine, at the financial server whether the acquisition data is valid, receive acquisition result information from the financial server, and register the acquisition result information in the blockchain database and transmit the acquisition result information to the service-providing device.

17. The intermediary server of claim 16, wherein the financial server includes a 1-st financial server and a 2-nd financial server, wherein the circuitry is further configured to transmit the acquisition request information to the 1-st financial server, wherein the 1-st financial server is configured to determine whether the acquisition data included in the acquisition request information is registered in the blockchain database, determine whether the acquisition data is valid, and in response to the acquisition data being determined as valid, transmit an acquisition request for the acquisition data to the 2-nd financial server, and in response to the acquisition result information being transmitted from the 2-nd financial server to the 1-st financial server, receive the acquisition result information from the I -st financial server.

\* \* \* \* \*